United States Patent
Rofougaran et al.

(10) Patent No.: US 12,464,454 B1
(45) Date of Patent: Nov. 4, 2025

(54) ACCESS REPEATER DEVICE AND METHOD OF DETECTING DISTRIBUTION OF UEs BASED ON INDUCED UE RESPONSE

(71) Applicant: PELTBEAM INC., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Arman Rofougaran, Newport Coast, CA (US); Milan Rofougaran, Newport Coast, CA (US); Puya Rofougaran, Irvine, CA (US); Kavian Odabaee, Newport Coast, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

(21) Appl. No.: 19/215,803

(22) Filed: May 22, 2025

Related U.S. Application Data

(63) Continuation of application No. 19/057,371, filed on Feb. 19, 2025, which is a continuation of application No. 18/903,496, filed on Oct. 1, 2024, now Pat. No. 12,262,316, which is a continuation of application No. 18/654,879, filed on May 3, 2024, now Pat. No. 12,150,050.

(51) Int. Cl.
*H04W 52/02* (2009.01)
(52) U.S. Cl.
CPC ... *H04W 52/0206* (2013.01); *H04W 52/0251* (2013.01)

(58) Field of Classification Search
CPC . H04W 52/0206; H04W 88/04; H04W 16/28; H04W 52/0251; H04W 52/00
See application file for complete search history.

(56) References Cited

U.S. PATENT DOCUMENTS

| | | | |
|---|---|---|---|
| 2020/0403689 A1* | 12/2020 | Rofougaran | H04W 52/245 |
| 2021/0126701 A1* | 4/2021 | Patel | H04B 7/15535 |
| 2022/0069896 A1 | 3/2022 | Besoli et al. | |

OTHER PUBLICATIONS

Non-Final Office Action for U.S. Appl. No. 18/654,879 dated Jun. 10, 2024.
Notice of Allowance for U.S. Appl. No. 18/654,879 dated Jul. 18, 2024.

* cited by examiner

*Primary Examiner* — Keith Ferguson
(74) *Attorney, Agent, or Firm* — CHIP LAW GROUP

(57) ABSTRACT

An access repeater device that controls transmission of a first beam of radio frequency (RF) signals at a first transmit (Tx) power level. The access repeater device controls decrease of the first Tx power level of the first beam of RF signals to induce a UE response at a second UE to increase a Tx radio power of an RF signal by the second UE. The access repeater device identifies that the second UE responds to the first beam of RF signals communicated in a test direction from a plurality of different test directions and modulates a transmit power output of the first beam of RF signals towards the second UE in the test direction.

20 Claims, 6 Drawing Sheets

ACCESS REPEATER DEVICE AND METHOD OF DETECTING DISTRIBUTION OF UEs BASED ON INDUCED UE RESPONSE

CROSS-REFERENCE TO RELATED APPLICATIONS/INCORPORATION BY REFERENCE

This Patent Application makes reference to, claims priority to, claims the benefit of and is a Continuation Application of U.S. patent application Ser. No. 19/057,371, filed on Feb. 19, 2025, which is a Continuation Application of U.S. patent application Ser. No. 18/903,496, filed on Oct. 1, 2024, now U.S. Pat. No. 12,262,316, which is a Continuation Application of U.S. Pat. No. 12,150,050, issued on Nov. 19, 2024. Each of the above-referenced applications is hereby incorporated herein by reference in its entirety.

FIELD OF TECHNOLOGY

Certain embodiments of the disclosure relate to repeater devices for wireless communication. More specifically, certain embodiments of the disclosure relate to an access repeater device and method of detecting distribution of user equipment (UEs) based on induced UE response.

BACKGROUND

Wireless telecommunication in modern times has witnessed the advent of various signal transmission techniques and methods, such as beamforming and beam steering techniques, for enhancing the capacity of radio channels. Further, in the wireless communication, repeater devices have become increasingly popular for extending coverage in various networking scenarios, including wireless and cellular networks, for example, extending coverage of a base station (e.g., a gNodeB) or a 5G-enabled small cell. It is known that repeater devices offer a practical and cost-effective solution for extending coverage in various networking environments, addressing coverage gaps, improving connectivity, and enhancing the overall performance of wireless and cellular networks. Generally, a repeater device that is used as a service node to directly interface and serve end-user devices, such as user equipment (UEs), may be referred to as an access repeater device. Further, in a wireless mesh network, the last stage repeater (i.e., the last repeater node) that serves the UEs may also be referred to as the access repeater device. Currently, there are certain technical challenges with respect to conventional access repeater devices, especially in 5G or the upcoming 6G environment.

In a first example, in the context of the last stage repeater (i.e., the access repeater device), challenges arise when dealing with mobile users, specifically those who are not predictable in their movements. Unlike fixed network nodes within the wireless mesh network, UEs pose difficulties due to their unpredictability in movement, making it challenging to effectively address their location and optimize energy transmission. In other words, in contrast to fixed network nodes integrated into the mesh network, which have known positions and traceability, the UEs (i.e., mobile users) present challenges in terms of accurately tracking their movements. The UEs may move in unpredictable patterns, making it difficult to maintain efficient communication with them using conventional repeater devices. Further, UEs typically are not part of the wireless mesh network and are not under the same level of control as a mesh node of a wireless mesh network. Thus, UEs may move unpredictably, changing direction or distance from the conventional access repeater, making it challenging to maintain efficient communication with them. One approach to addressing this issue may be to track each UE individually and adjust the beam of the repeater accordingly. However, this can be complex and resource intensive. Another approach is to widen the beam of the conventional repeater to cover a broader area, which increases the likelihood of covering the UEs even if it moves unpredictably. However, this approach comes at the expense of range, as spreading the energy over a wider area reduces the signal strength and limits the distance the signal can reach.

In another example, power consumption in 5G-enabled UEs is another technical issue. High power consumption in 5G-enabled UEs primarily stems from the Radio Frequency Front End (RFFE) and digital baseband processing, which is necessitated by supporting numerous antenna elements for beamforming. Additionally, inefficiencies in RF components at high frequencies, demands for multiple-input multiple-output (MIMO) layers, large bandwidth for carrier aggregation (CA) operations, among other factors, may contribute to increased power consumption. This heightened power demand not only accelerates battery depletion in the 5G-enabled UEs but also triggers overheating issues, adversely impacting UE performance and potentially shortening battery lifespan.

In yet another example, Quality of Experience (QoE) is another open issue, which is a measure of a user's holistic satisfaction level with a service provider (e.g., Internet access, phone calls, or other carrier network-enabled services). The challenge is how to ensure seamless connectivity as well as QoE without significantly increasing infrastructure costs, which may be commercially unsustainable with present solutions. Moreover, the performance of UEs varies with the location of the UEs and their proximity to the access repeater device or service side of a conventional repeater. This is because the usual method of wide beam access, although it works in proximity to the conventional repeater device but suffers as a given UE, moves at greater distances from the conventional repeater device, especially for mmWave communication due to signal attenuation.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

An access repeater device and method of detecting distribution of user equipment (UEs) based on induced user equipment (UE) response, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in an access repeater device and method of detecting distribution of user equipment (UEs) based on induced user equipment (UE) response. The access repeater device and the method of the present disclosure may be configured to initially detect a distribution of a set of user equipment (UEs) within a defined physical coverage zone of the access repeater device, based on a first beam of radio frequency (RF) signals transmitted at a first transmit (Tx) power level from the access repeater device. For example, a first UE may be detected at a first distance from the access repeater device within the defined physical coverage zone of the access repeater device at a first instance although more UEs may be present, such as a second UE at a second distance. The access repeater device may then control the decrease (i.e., a forced and intentional decrease) of a first Tx power level of a first beam of RF signals from the access repeater device to a second Tx power level. This decrease of the first Tx power level of the first beam of RF signals may induce a UE response at the second UE at the second distance to increase a Tx radio power of an RF signal emitted by the second UE previously hidden to the access repeater device at the first instance. The access repeater device may then re-detect the distribution of the set of UEs within the defined physical coverage zone at a second instance, based on the UE response. This time, i.e., at the second instance, the detected (or re-detected) set of UEs comprises the first UE as well as the second UE (i.e., the previously undetected UE is now detected). This dynamic power management strategy not only makes the previously undetected UE, now detectable but also the improved energy transmission from the access repeater device and induced UE response addresses the high-power consumption issues, for example, in 5G-enabled UEs. By reducing unnecessary power levels, the access repeater device positively influences and reduces the overheating problems in UEs associated with the Radio Frequency Front End (RFFE) and digital baseband processing. The optimization of coverage and power levels based on real-time or near real time UE distribution enhances the overall efficiency and reliability of the wireless network, ensuring a more consistent Quality of Experience for users. Further, the dynamic adjustments in Tx power levels by the access repeater device contribute to maintaining a consistent and reliable connection with UEs. This advantage becomes particularly more useful for mmWave communication, where signal attenuation at greater distances is a challenge, and conventional wide beam or narrow beam access methods may suffer. In the following description, reference is made to the accompanying drawings, which form a part hereof, and in which is shown, by way of illustration, various embodiments of the present disclosure.

Figure 1:
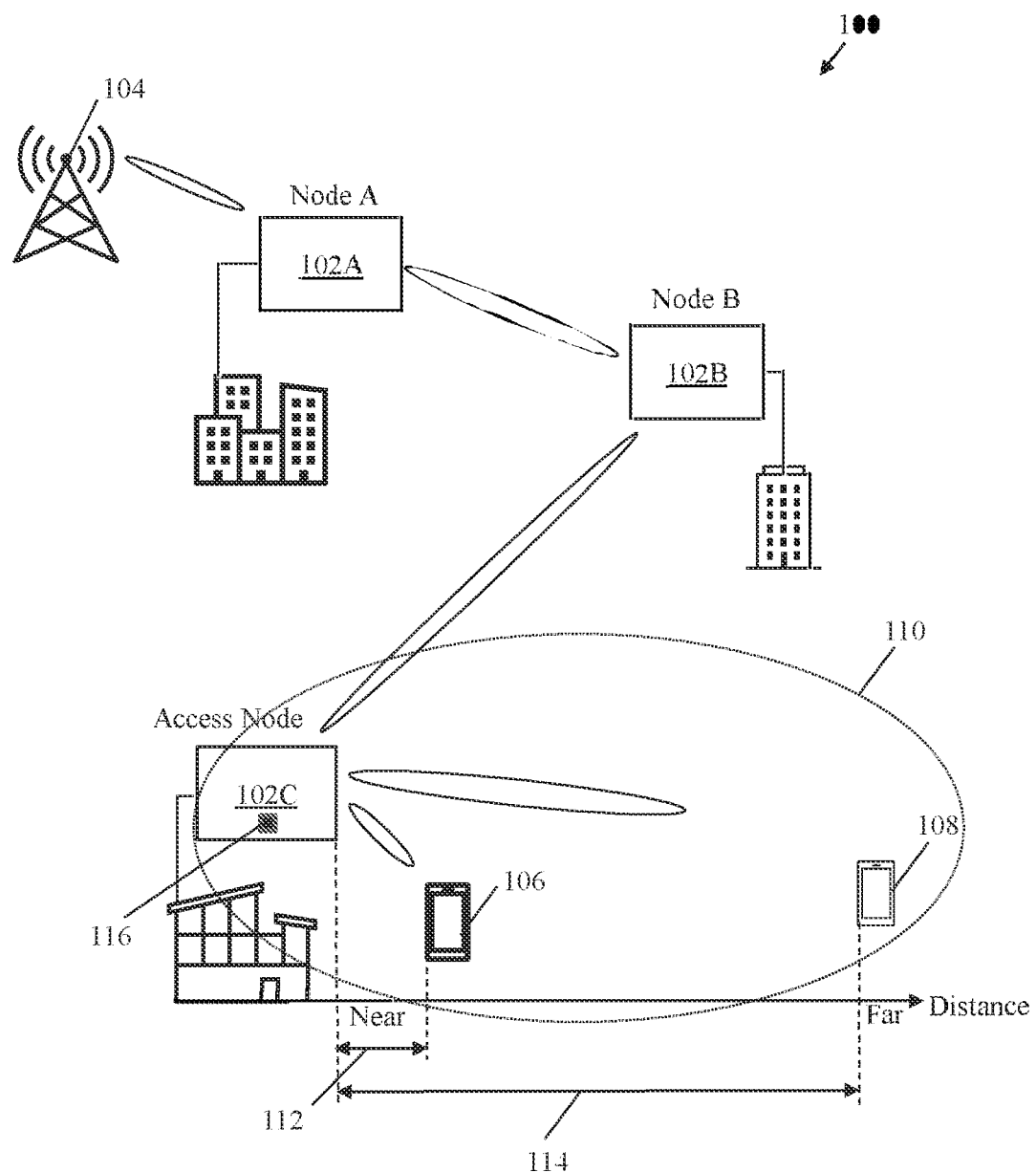
FIG. 1 is a diagram illustrating a network environment of an access repeater device in a wireless communication system, in accordance with an exemplary embodiment of the disclosure.

FIG. 1 is a diagram illustrating a network environment of an access repeater device in a wireless communication system, in accordance with an exemplary embodiment of the disclosure. With reference to FIG. 1, there is shown a wireless communication system 100. The wireless communication system 100 may include an access repeater device 102C.

The access repeater device 102C may be a part of a network of repeater devices, and may be communicatively coupled to other network nodes, such as a root repeater device 102A and an intermediate repeater device 102B. The network of repeater devices may be a wireless mesh network or a daisy-chain network of repeater devices. The root repeater device 102A may be referred to as a first type of repeater device or a root node (e.g., Node A) that may be communicatively coupled to a base station 104 (e.g., a gNodeB or gNB). The intermediate repeater device 102B may be referred to as a second type of repeater device or an intermediate node (Node B) that is disposed between the root node (the root repeater device 102A) and the access repeater device 102C. In practice, there may be multiple intermediate nodes. In an implementation, the intermediate repeater device 102B may also be implemented as a switch node configured to receive a beam of RF signals and relay the received beam of RF signals concurrently or alternatively to two or more other network nodes in different directions to form a mesh configuration in the wireless mesh network. In the daisy-chain network of repeater devices, the intermediate repeater device 102B may be configured to receive a beam of RF signals from one side (e.g., donor side) and relay the received beam of RF signals from another side (e.g., relay side or service side). The access repeater device 102C may be a third type of repeater device or an access node configured to service one or more UEs, such as a first UE 106 and a second UE 108, in a defined physical coverage zone 110. The access repeater device 102C may be the last stage repeater node directly interface and serve end-user devices, such as the one more UEs.

In an implementation, each of the root repeater device 102A, the intermediate repeater device 102B, and the access repeater device 102C may be one of an analog repeater device or a hybrid analog-digital repeater device. In the hybrid analog-digital repeater device, a data propagation path of user data relayed through a network of the repeater devices may be analog without any digital decoding or encoding of the user data in a RF signal to reduce latency less than a threshold time, such as within nanoseconds. Further, a backchannel connectivity and control of the network of the repeater devices may be via a lower frequency (e.g., sub-6 GHz cellular frequency or WLAN frequency such as 2.4 GHz or 5 Ghz of Wi-Fi® 7 or 8), based on signal metadata of the incoming RF signal. While the data propagation path may remain entirely analog for the lowest latency, each network node of the network of the repeater devices may extract the signal metadata from RF signals for analysis. This allows deriving wireless metrics like timing parameters, signal quality, interference levels, channel state information, and reference signals using digital signal processing (DSP) techniques. Thus, the simplicity and low latency of analog signal relaying is intelligently combined with the flexibility and intelligence of digital processing in a hybrid architecture. Each of the network node in the network of repeater devices may be arranged at different locations. Furthermore, in the wireless communication system 100, there may be two types of connections referred to as a backhaul connection (or simply referred as backhaul) and an access connection. The backhaul and access connection may not be on the same radio frequency (RF) and/or transmission medium. The backhaul connection may be for the backchannel connectivity and control of the network of the repeater devices. The access connection may refer to end-user access provided by the access repeater device 102C to serve end-user devices, such as the one more UEs. The separation of the backhaul and access connections allows for more granular control over quality-of-service (QOS) parameters, such as latency, jitter, and packet loss. Thus, backhaul traffic may be prioritized for network management and control purposes while maintaining consistent service quality for end-user access. Further, as the backhaul and the access connection may not be on the same radio frequency (RF) and/or transmission medium, the network redundancy and resilience may be improved. For example, the network may remain operational and accessible to end-users, even if one part of the infrastructure experiences issues.

The first UE 106 may be at a first distance 112 (comparatively near) from the access repeater device 102C, and the second UE 108 may be at a second distance 114 (comparatively far) from the access repeater device 102C. Each of one or more UEs may correspond to a portable wireless device, such as a smartphone or telecommunication hardware other than a smartphone (portable or non-portable) used by an end-user to communicate. Examples of the one or more UEs (e.g., the first UE 106 and the second UE 108) may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any other customized hardware for wireless communication.

The controller 116 may be a Field Programmable Gate Array (FPGA), which may be configured to receive an incoming RF signal relay from an upstream node, such as the intermediate repeater device 102B and relay the incoming RF signal to one or more UEs within the defined physical coverage zone 110. In an implementation, the controller 116 may be configured to extract signal metadata by digital signal processing of a portion (e.g., a header portion) of the incoming RF signal without decoding the user data of the incoming RF signal. Other examples of the implementation of the controller 116 may include but are not limited to an embedded processor, a microcontroller, a control chip, a Reduced Instruction Set Computing (RISC) processor, an Application-Specific Integrated Circuit (ASIC) processor, a Complex Instruction Set Computing (CISC) processor, and/or other processors, or state machines.

It is known that high power consumption in 5G-enabled UEs primarily stems from the Radio Frequency Front End (RFFE) and digital baseband processing, which is necessitated by supporting numerous antenna elements for beamforming. Additionally, inefficiencies in Radio Frequency (RF) components at high frequencies, demands for multiple-input multiple-output (MIMO) layers, and large bandwidth for carrier aggregation (CA) operations, among other factors, may contribute to increased power consumption. This heightened power demand not only accelerates battery depletion in the 5G-enabled UEs but also triggers overheating issues, adversely impacting UE performance and potentially shortening battery lifespan. Reducing power consumption in UEs (e.g., 5G-enabled mobile devices) is one of the most active areas of research for the application of mmWave technologies on smartphones.

In the present disclosure, the network of repeater devices, such as the root repeater device 102A, the intermediate repeater device 102B, and the access repeater device 102C may reduce UE's power consumption by virtually and transparently closing the distance between one or more UEs (such as the first UE 106 and the second UE 108) to the base station 104 (e.g., the gNB). This provides a significant benefit (an energy-saving feature) for extending the battery life of one or more UEs. However, it is observed that as a result of this closing the distance between one or more UEs to the base station 104 (e.g., the gNB), there also arises an undesired situation when the one or more UEs dynamically reduce their transmit (Tx) power of RF signal for short-range communication, potentially rendering them "invisible" or "hidden" to an access repeater device (such as the access repeater device 102C) due to a low RF energy footprint.

For enhanced wireless communication, the access repeater device 102C may be required to be aware of the presence and direction of each UE within the defined physical coverage zone 110. However, typically, a repeater device may not have control over or the ability to directly adjust any of the UE's RF parameters, such as transmit power level (Tx power), receiver sensitivity, etc. However, in the present disclosure, the access repeater device 102C uses an intelligent approach, where the access repeater device 102C may periodically or specifically lower its TX power level to effectively present itself at a farther distance than its actual location. This action causes the UE (which was hidden previously) to increase its radio TX power to "reach" (i.e., establish an RF communication with) the servicing repeater (i.e., the access repeater device 102C), and because of this induced process, all UEs in the defined zone may emit enough electromagnetic energy so the access repeater device 102C may detect their presence and map their approximate location, for high-performance communication.

In operation, firstly, the controller 116 of the access repeater device 102C may be configured to detect a distribution of a set of user equipment (UEs) within the defined physical coverage zone 110 of the access repeater device 102C, based on a first beam of radio frequency (RF) signals transmitted at a first transmit (Tx) power level from the access repeater device 102C. The first UE 106 may be detected at the first distance 112 from the access repeater device 102C within the defined physical coverage zone 110 of the access repeater device 102C at a first instance. The "first Tx power level" refers to the initial amount of power used by the repeater device when transmitting radio frequency (RF) signals. The first instance may refer to a first time point when a first attempt is made to detect the distribution of all UEs within the defined physical coverage zone 110. In practice, UEs may be distributed at different locations in the defined physical coverage zone 110. One or more UEs, such as the first UE 106, present in close proximity (i.e., at the first distance 112 or near) to the access repeater device 102C may be easily visible to the access repeater device 102C, so such UEs may be detected by the access repeater device 102C by an initial scan of UEs using the first beam of RF signals transmitted at the first Tx power level from the access repeater device 102C. There may be some more UEs (not shown in FIG. 1) in the mid-range (i.e., between the first distance 112 and the second distance 114). For such UEs present in the mid-range, the access repeater device 102C may still detect their RF signals, which is also acceptable. However, there's a challenge with UEs that are far from the access repeater device 102C (like the second UE 108) that cannot be detected because they remain hidden from the access repeater device 102C. As these UEs, such as the second UE 108, may not be transmitting RF signals at high power, it becomes a technical challenge for the access repeater device 102C to detect their radiated energy.

To address the challenge of detecting such hidden UEs, the access repeater device 102C may be further configured to align its beam of RF signals and compel the hidden UEs, such as the second UE 108, to come out of hiding. The controller 116 of the access repeater device 102C may be configured to control the decrease of the first Tx power level of the first beam of RF signals from the access repeater device 102C to a second Tx power level. In other words, the access repeater device 102C employs an intelligent strategy that involves deliberate or forced lowering of the Tx power level, forcing the hidden UEs (not transmitting previously RF signals at high power) to transmit at a higher power level. In other words, the decrease of the first Tx power level of the first beam of RF signals may induce a UE response at the second UE 108 at the second distance 114 to increase the Tx radio power of an RF signal emitted by the second UE 108 hidden to the access repeater device 102C at the first instance. This allows the access repeater device 102C to detect the UEs not only in close proximity or those in the mid-range but also have visibility on the UEs, such as the second UE 108, which were initially hidden or undetected.

Generally, a repeater device may not have control over or the ability to directly adjust any of the UE's RF parameters, such as transmit power level (Tx power), receiver sensitivity, etc. The Tx power affects the quality of a communication link, and more Tx power means more battery consumption in the given UE. The receiver sensitivity corresponds to the ability of the given UE to detect and demodulate weak incoming signals. Unlike active network elements, such as the base station 104, an analog repeater device does not intervene in the control or adjustment of UE-specific RF parameters. This non-interference with UE RF parameters ensures that the repeater device remains transparent to the connected devices, allowing them to maintain their specific RF configurations. Mostly, the repeater device may operate as passive devices that amplify and retransmit signals without actively manipulating the RF parameters of connected UEs. The lack of control over UE RF parameters indicates that the repeater device may rely on optimizing its own signal transmission characteristics, such as beamforming and power adjustments, to enhance communication within its coverage zone, such as the defined physical coverage zone 110.

In the present disclosure, when the access repeater device 102C intentionally or deliberately transmits a low-power signal, the second UE 108 may perceive that the base station 104 (i.e., gNB) is at a greater distance. In response, the second UE 108 may increase its RF Tx power back to the base station 104 (i.e., gNB) independently. This dynamic feedback loop allows the access repeater device 102C to influence the UE's behavior based on the forced or deliberate low-power transmission, i.e., at the second Tx power level. The second Tx power level may be lower than the first Tx power level. Thus, when the access repeater device 102C controls the decrease of the first Tx power level of the first beam of RF signals from the access repeater device 102C to the second Tx power level (i.e., intentionally transmits at a low power level), the second UE 108 may adapt and respond by increasing its' transmit power. Consequently, the base station 104 (gNB) may further respond by adjusting its transmission power. This cyclical process may continue as the access repeater device 102C may receive information from the second UE 108, prompting adjustments in the access repeater device 102C transmission power to maintain effective communication.

In accordance with an embodiment, the decrease of the first Tx power level of the first beam of RF signals may be performed periodically or in a targeted operation to present the access repeater device 102C at a greater distance that its actual location, compelling the second UE 108 to come out of hiding by increasing the Tx radio power at the second UE 108 in a closed-loop feedback. The closed-loop feedback refers to a communication loop where the second UE 108 detects the changes in the received RF signals and responds accordingly to establish and maintain communication with the base station 104 (gNB) via the access repeater device 102C. The term "periodically" refers to performing the action of decreasing the transmit power of the first beam of RF signals at regular intervals. This means that at specific time intervals, the access repeater device 102C deliberately reduces its transmitted power to create the desired effect. In the targeted operation, the action of the decrease in transmit power may not be random but may be carried out with a particular goal, such as compelling the second UE 108 to come out of hiding. This targeted approach indicates a deliberate and purposeful adjustment of the transmit power for a specific outcome. By periodically or selectively decreasing the transmit power level, the access repeater device 102C may effectively manipulate its perceived distance from the second UE 108. This manipulation is an intelligent strategy employed by the access repeater device 102C to induce the second UE 108 to elevate its Tx radio power, making the previously undetectable UE, such as the second UE 108, at the first instance to become detectable and communicable within the defined physical coverage zone 110 of the access repeater device 102C. At this stage, where the precise locations of the second UE 108 may be unknown, the objective may be to prompt the hidden UEs, such as the second UE 108, to transmit at their maximum power to enhance detection. The strategy involves intentionally reducing the transmit power of the access repeater device 102C, creating an illusion of an increased distance. This compels UEs, e.g., cell phones, to operate at their highest power levels, simplifying the process of detecting their presence. Thus, the access repeater device 102C operations may be manipulated in a way that compels UEs, such as the second UE 108, to transmit at high power, ensuring they cannot remain hidden.

In accordance with an embodiment, the controller 116 may be further configured to monitor that the second UE 108 is responding to the first beam of RF signals communicated in a test direction from among a plurality of different test directions. The controller 116 may be further configured to maintain the test direction while modulating a transmit power output of the first beam of RF signals towards the second UE 108. The controller 116 may be further configured to transmit test beams of RF signals in various directions. The controller 116 may be further configured to analyze the responses from the UEs, such as the second UE 108, to different test beams and identify the test direction that elicits the strongest response, indicating the direction of the second UE 108. Thus, when the access repeater device 102C determines that a user, i.e., the second UE 108, is responding to the transmitted test beam of RF signals in the identified test direction, the beam direction may be maintained, but the Tx power level of the test beam may be modulated towards the user, i.e., the second UE 108. The user, i.e., the second UE 108, may respond to the modulated Tx power level of the test beam and adapt its Tx power to compensate for the received RF signal (i.e., the modulated Tx power level of the test beam). This dynamic interaction ensures alignment between the access repeater device 102C and the second UE 108. The dynamic interaction due to closed-loop feedback (i.e., a closed-loop power control system) may also influence the user's behavior of the second UE 108. Continuous adjustment of the beam direction and monitoring of the maximum response allows the access repeater device 102C to precisely determine when it is aligned with the second UE 108. When the transmission (i.e., the modulated Tx power level of the test beam) is directly targeted at the second UE 108, the second UE 108 may communicate a feedback signal to the base station 104 about the received power, leading to a subsequent reduction in power by the base station 104. This iterative process, where the access repeater device 102C independently varies the power and analyzes the responses of the second UE 108, enables informed decision-making for optimizing communication parameters at the access repeater device 102C. For example, the access repeater device monitors the UE's response. If the UE response indicates weak reception, the access repeater device 102C may increase its transmission power within reasonable limits for better signal strength. Conversely, a strong response might indicate precise alignment, prompting the access repeater device 102C to reduce power to save energy and minimize interference. Beneficially, the access repeater device 102C avoids unnecessary power consumption at the access repeater device 102C itself as well as the second UE 108 by adjusting the transmission power based on the UE's needs. Further, by adjusting the power based on the specific UE (e.g., the second UE 108 in this case) being targeted, the access repeater device 102C may minimize interference with other UEs in the vicinity.

In accordance with an embodiment, based on the UE response, the controller 116 may be further configured to adjust a combination of an antenna pattern settings, a beam splitting settings, and transmit beam power settings for the re-detection of the distribution of the set of UEs within the defined physical coverage zone 110. The controller 116 may be further configured to analyze the response from each UE in the defined physical coverage zone 110. This analysis can involve identifying UEs (i.e., determining which UEs responded and their locations based on the received signal), measuring received signal strength from each UEs, and in some implementations, even decoding the reported beam characteristics (when available) to understand the UE's perception of the transmitted beam from the access repeater device 102C. Based on the analysis of the UE responses, the controller 116 may be configured to adjust the combination of different settings to improve the re-detection process. Based on the antenna pattern settings, the controller 116 may be configured to adjust the radiation pattern of one or more phase array antennas to focus the beam of RF signals in identified test directions or null out areas where no UEs are detected. Based on the beam splitting settings, the controller 116 may be configured to adjust beam splitting ratios, which may alter the direction and shape of the transmitted beams, potentially leading to better coverage or isolation of specific UEs. Based on the transmit beam power settings, the controller 116 may be configured to increase or decrease the power of individual beams based on the UE responses. Stronger power might be needed for distant UEs with weak responses, while weaker power might be sufficient for nearby UEs with strong responses. After adjusting the different settings, the controller 116 may retransmit one or more beams of RF signals using the modified settings. This re-detection process may ensure that UEs within the defined physical coverage zone 110 may be detected and their locations are accurately estimated and at the same time resource allocation are optimized. For example, the controller 116 may be configured to allocate resources like power and bandwidth more efficiently to serve the detected UEs effectively.

In accordance with an embodiment, based on the detected distribution of the set of UEs in the defined physical coverage zone 110, the controller 116 may be further configured to determine a relative positions of the UEs to optimize the beamforming strategy. If the UEs are relatively stationary and close together, the controller 116 of the access repeater device 102C may be further configured to either optimize its beam by changing its beam pattern or split into two beams of RF signals to improve coverage and signal strength for all UEs. The access repeater device 102C may be further configured to set the gain of both beams equally to provide consistent coverage throughout the area (i.e., the defined physical coverage zone 110). However, when dealing with distant UEs, such as UEs at the second distance 114, finding an optimal solution for both UEs with a single beam becomes challenging. In such a case, the access repeater device 102C may be configured to split the beam into two separate beams with different polarizations, where vertical polarization (V) may serve the UE(s) at the first distance 112 (UEs that are near) and horizontal polarization may serve the far users, i.e., the UEs at the second distance 114. In vertical polarization, the electric field component of the electromagnetic wave (i.e., the mmWave signal) oscillates vertically, meaning it moves up and down concerning the Earth's surface. In horizontal polarization, the electric field component of the electromagnetic wave (i.e., the mmWave signal) oscillates horizontally, moving side to side parallel to the Earth's surface. Thus, through this interplay of adjusting the antenna pattern, splitting the beam, and manipulating power, the access repeater device 102C may effectively not only detect the users' locations but significantly improve the network performance.

In accordance with an embodiment, the controller 116 may be further configured to calibrate a beam pattern of the first beam of RF signals to concurrently serve the first UE 106 at the first distance 112 and the second UE 108 at the second distance 114 from the access repeater device 102C, based on the UE response. Based on the relative position evaluation, the controller 116 may be further configured to assess whether the UEs are positioned in a way that allows a single beam to serve them both adequately. This evaluation might consider factors like distance difference between the UEs and channel characteristics. If the distance difference is relatively small (less than a defined threshold), a single beam might be able to cover both UEs with sufficient signal strength. Further, the presence of obstacles or signal fading in certain directions might influence the suitability of a single beam, and thus, monitoring of UE responses from each UE may be performed periodically. The benefits of using a single beam instead of separate beams may be the conservation of resources like power and bandwidth.

In accordance with an embodiment, the access repeater device 102C may be further configured to manipulate (or calibrate) not only the transmit power but also the phase of the transmitted RF signals. The controller 116 may intentionally adjust the phase of the signals and analyze the subsequent response from the UEs. The manipulation of the phase provides useful information regarding the angle and distance of the UEs, contributing to a comprehensive two-dimensional (2D) understanding of their locations. By leveraging these capabilities, the access repeater device 102C may efficiently locate UEs within its coverage area and optimize the access repeater device's RF characteristics, encompassing antenna patterns for both vertical (V) and horizontal (H) dimensions, ensuring alignment with the specific environmental conditions.

In accordance with an embodiment, based on the UE response, the controller 116 may be further configured to execute a beam splitting operation in which the first beam of RF signals in a first beam pattern is locked on the first UE 106 at the first distance 112 and a second beam of RF signals in a second beam pattern is directed at the second UE 108 at the second distance 114 from the access repeater device 102C to concurrently serve the first UE 106 and the second UE 108. In certain scenarios, when dealing with distant UEs, such as the second UE 108 at the second distance 114, finding an optimal solution for both UEs with a single beam becomes challenging. In such a case, the beam splitting operation is executed to concurrently serve communication with both the first UE 106 and the second UE 108, optimizing the coverage and connectivity by the access repeater device 102C. The controller 116 may be configured to analyze the responses and estimate signal strength and relative positions of both UEs, and if the relative positions are greater than a threshold distance, it may be ascertained that achieving good signal strength for both UEs with a single beam will be difficult. Thus, the first beam of RF signals in a first beam pattern (a smaller range) may be locked on the first UE 106 to ensure strong signal reception at the first UE 106 while the second beam may be directed towards the second UE 108 with the second beam pattern (a larger range and transmit power) different from the first beam pattern. The second beam pattern may focus the RF signals at the direction of the second UE 108 to improve its reception quality. Thus, the controller 116 analyze the UE response to estimate the UEs positions and channel conditions to determine whether utilizing a single beam with adjustments or resorting to beam splitting may be the most efficient approach to serve the UEs effectively in a multi-gigabit data rate at both UEs, such as the first UE 106 and the second UE 108.

In accordance with an embodiment, based on the UE response, the controller 116 may be further configured to execute a beam splitting operation in which the first beam of RF signals in a first polarization is locked on the first UE 106 at the first distance 112 and a second beam of RF signals in a second polarization is directed at the second UE 108 at the second distance 114 from the access repeater device 102C to concurrently serve the first UE 106 and the second UE 108. The controller 116 may be configured to combine the beam splitting with polarization diversity to concurrently serve two UEs located at different distances from the access repeater device 102C. When relative position of two UEs indicate that the UEs are at significantly different distances or have different channel conditions, the controller 116 may be configured to communicate two separate beams with different polarizations (vertical and horizontal polarization). Utilizing different polarizations helps mitigate signal fading caused by environmental factors, and interference potentially improving overall communication reliability.

In accordance with an embodiment, based on the UE response, the controller 116 may be further configured to execute a beam splitting operation in which the first beam of RF signals in a first polarization with a first Tx power is locked on the first UE 106 at the first distance 112 and a second beam of RF signals in a second polarization with a second Tx power is directed at the second UE 108 at the second distance 114 from the access repeater device 102C to concurrently serve the first UE 106 and the second UE 108. The second Tx power may be higher than the first Tx power. In this case along with polarization diversity, different Tx power may be used for UEs at different distances through different polarization. The access repeater device 102C may be configured to communicate separate beams with different polarizations, one directed towards the closer user (i.e., the first UE 106 at the first distance 112) with lower Tx power for efficient resource usage, and another beam directed towards the farther user (i.e., the second UE 108 at the second distance 114) with higher transmit power and a different polarization to compensate for the distance. This approach potentially not only improves signal quality for both users (i.e., both the first UE 106 and the second UE 108), but also reduces interference, and leverages polarization diversity to mitigate signal fading.

In accordance with an embodiment, for efficient user management in the wireless communication system 100, especially when dealing with multiple users, their general location (far or close) may take precedence over individual direction. The access repeater device 102C may utilize both transmit power and phase analysis to categorize UEs into groups based on estimated distance. For close groups of UEs, a single optimized beam with balanced gain efficiently serves them. For far groups of UEs, beam splitting with potentially higher dedicated power improves signal strength. This adaptation extends to the number of users, whether single, multiple, or a group, considering their relative locations and movement patterns. Whether stationary or mobile, the access repeater device 102C may employ dynamic adjustments through beam pattern manipulation, Tx power adjustments, and adaptation to user movement and group dynamics, ultimately aiming to efficiently detect and serve UEs within the defined physical coverage zone 110 for reliable communication.

The controller 116 may be further configured to re-detect the distribution of the set of UEs within the defined physical coverage zone 110 at a second instance, based on the UE response. The set of UEs that are re-detected may comprise the first UE 106 at the first distance 112 and the second UE 108 at the second distance from the access repeater device 102C. The second distance 114 may be farther from the first distance 112 with respect to the access repeater device 102C. Thus, the distribution of the set of UEs in the defined physical coverage zone 110 may be re-evaluated based on corresponding UE responses, allowing it to adjust its operations, like adjusting beam pattern, transmit power level, or polarization setting to maintain efficient communication with users at different locations.

In accordance with an embodiment, the controller 116 may be further configured to periodically scan the defined physical coverage zone 110 in a horizontal plane with reference to a ground plane to locate a distribution different UEs within the defined physical coverage zone 110 while one or more service beams of RF signals are concurrently locked onto the set of UEs. The ground plane may refer to earth's surface. The purpose of the scan may be to periodically re-detect and/or re-locate the distribution of different UEs within the defined physical coverage zone 110. In other words, new UEs that might have entered the defined physical coverage zone 110 since the previous scan, may be detected. Further, existing UEs that might have moved to different locations within the defined physical coverage zone 110, may require an updated beam of RF signals with updated beam pattern and transmit power. Furthermore, for moving UEs, maintaining a locked beam on one user might not be feasible. Thus, the first beam of RF signals in the first polarization (e.g., V polarization) with the first Tx power may be locked on the first UE 106 that is comparatively more stationary or manifest less movement than the second UE 108. The second beam of RF signals in the H-polarization may then be used to scan the environment periodically to monitor and track the location of the second UE 108. Once the second UE 108 is identified, the access repeater device 102C may temporarily lock another beam (like the V-polarization beam) onto that second UE 108 to maintain a strong connection while continuing a sector search for other UEs using a third beam in H-polarization. Thus, one beam of RF signals may be kept free as a search beam and used to identify and locate new users, i.e., new UEs previously undetected using UEs response in the defined physical coverage zone 110.

Figure 2:
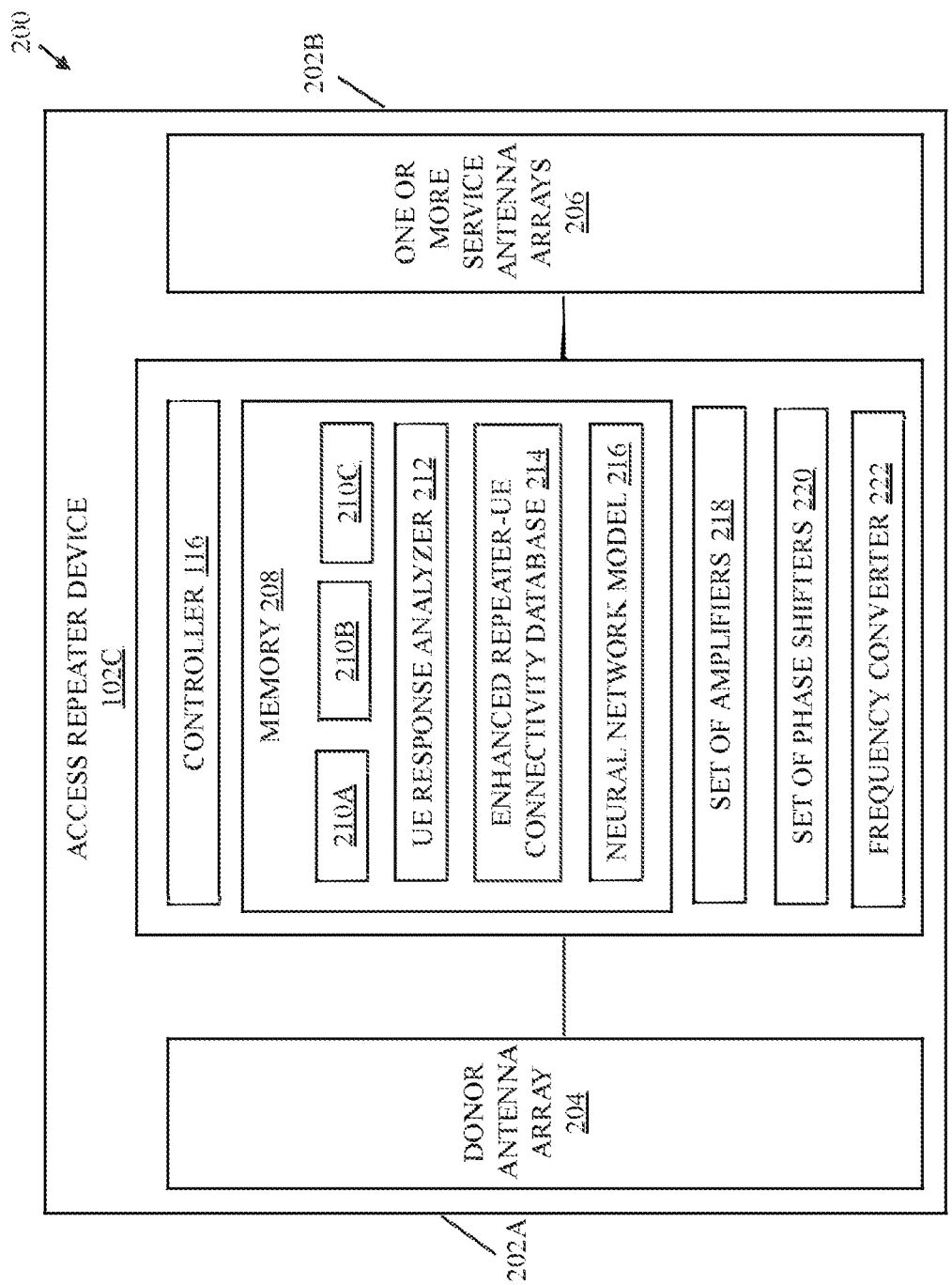
FIG. 2 is a block diagram illustrating different components of an exemplary access repeater device, in accordance with an embodiment of the disclosure.

FIG. 2 is a block diagram illustrating different components of an exemplary access repeater device, in accordance with an embodiment of the disclosure. FIG. 2 is explained in conjunction with elements from FIGS. 1A and 1B. With reference to FIG. 2, there is shown a block diagram 200 of the access repeater device 102C with various components. The access repeater device 102C has a donor side 202A facing an upstream node (e.g., the intermediate repeater device 102B in a network of repeater devices. The access repeater device 102C may have a service side 202B facing towards one or more UEs, such as the first UE 106 and the second UE 108.

In an implementation, the access repeater device 102C may include a front-end radio frequency (RF) section, which may include a donor antenna array 204 at the donor side 202A, and further one or more service antenna arrays 206 at the service side 202B. The access repeater device 102C may include the controller 116 communicatively coupled to the front-end RF section, such as the donor antenna array 204 and the one or more service antenna arrays 206. The front-end RF section supports millimeter-wave (mmWave) communication as well communication at a WLAN frequency (e.g., Wi-Fi® 7 or 8 5-9 gigahertz (GHz) frequency). The access repeater device 102C may further include a memory 208, a set of amplifiers 218, a set of phase shifters 220, and a frequency converter 222. The memory 208 may include an antenna pattern settings 210A, a beam splitting settings 210B, and a transmit beam power settings 210C, a UE response analyzer 212, an enhanced Repeater-UE connectivity database 214, and a neural network model 216.

The access repeater device 102C includes suitable logic, circuitry, and interfaces that may be configured to detect a distribution of a set of user equipment (UEs) within a defined physical coverage zone 110 of the access repeater device 102C. The access repeater device 102C may support multiple and a wide range of frequency spectrum, for example, 4G, 5G, and 6G (including out-of-band frequencies and WLAN frequencies, such as Wi-Fi® 7 or 8).

In accordance with an embodiment, the access repeater device 102C may be configured to perform Multi-User, Multiple Input, Multiple Output (Mu-MIMO) to corresponding connected UEs via corresponding mmWave New Radio Unlicensed (NR-U) links or licensed cellular signals in 5G NR frequency band. The use of millimeter-wave frequencies and Mu-MIMO together may provide high data rates and efficient use of the available spectrum. Millimeter-wave frequencies offer increased bandwidth, and Mu-MIMO enhances the overall network capacity by enabling simultaneous communication with multiple user devices. This can result in improved throughput and reduced latency, contributing to a more robust and high-performance wireless communication system, particularly in the context of 5G NR deployments.

The donor antenna array 204 may be provided at the donor side 202A of the access repeater device 102C and may be communicatively coupled to the controller 116. The donor antenna array 204 may be communicatively coupled to a cascading receiver chain comprising various components (e.g., a set of low noise amplifiers (LNA), a set of receiver front end phase shifters, and a set of power combiners) for the signal reception (not shown for brevity). The donor antenna array 204 may be configured to receive an incoming RF signal from an upstream node. The donor antenna array 204 may be a phase array antenna, such as a dual-polarized antenna.

The one or more service antenna arrays 206 may be provided at the service side 202B and may be communicatively coupled to the controller 116. The one or more service antenna arrays 206 may be configured to relay one or more beams of RF signals to one or more UEs. In an implementation, each of the one or more service antenna arrays 206 may be dual-polarized antenna arrays, where separate antenna arrays may be used for horizontal and vertical polarizations allowing polarization diversity mechanisms. The access repeater device 102C may include multiple phased array antennas (e.g., the one or more service antenna arrays 206) with electrically steerable directive beams to focus signals along narrow beams or wide beams. The phase antenna arrays may include individual phase shifters and amplifiers behind each radiating element to shape and control the beam pattern digitally. Each of the donor antenna array 204 and the one or more service antenna arrays 206 may be one of an XG phased-array antenna panel, an XG-enabled antenna chipset, an XG-enabled patch antenna array, or an XG-enabled servo-driven antenna array, where the "XG" refers to 5G or 6G. Examples of implementations of the XG phased-array antenna panel include, but are not limited to, a linear phased array antenna, a planar phased array antenna, a frequency scanning phased array antenna, a dynamic phased array antenna, and a passive phased array antenna.

The memory 208 may be configured to store values calculated by the controller 116. Examples of the implementation of the memory 208 may include, but are not limited to, a random access memory (RAM), a dynamic random access memory (DRAM), a static random access memory (SRAM), a processor cache, a thyristor random access memory (T-RAM), a zero-capacitor random access memory (Z-RAM), a read-only memory (ROM), a hard disk drive (HDD), a secure digital (SD) card, a flash drive, cache memory, and/or other non-volatile memory. It is to be understood by a person having ordinary skill in the art that the access repeater device 102C may further include one or more other components, such as an analog to digital converter (ADC), a digital to analog (DAC) converter, a cellular modem, and the like, known in the art, which are omitted for brevity. For instance, the ADC may be configured to convert a header portion of a RF signal (in mmWave frequency or WLAN frequency) from analog to digital domain. While the data path remains entirely analog for lowest latency, each of the network node of the network of repeater devices may extract signal metadata from RF signals for analysis. This allows deriving wireless metrics like timing parameters, signal quality, interference levels, channel state information, and reference signals using DSP techniques. In some implementations, a WLAN adaptor may be provided to handle lower WLAN frequencies (e.g., 2.4 GHz or 5 GHz in Wi-Fi®7 or 8) to establish a backchannel communication link. This may be used for various purposes, including management and coordination between devices in a wireless network. The WLAN adaptor may be configured to provide a backchannel connectivity and control of the network of the repeater devices based on the extracted signal metadata of incoming RF signal.

Each of the antenna pattern settings 210A, the beam splitting settings 210B, and the transmit beam power settings 210C may be stored in the memory 208. The controller 116 may be further configured to adjust a combination of the antenna pattern settings 210A, the beam splitting settings 210B, and the transmit beam power settings 210C for the re-detection of the distribution of the set of UEs within the defined physical coverage zone 110. The controller 116 may be configured to utilize the antenna pattern settings 210A to adjust the radiation pattern of one or more service antenna array 206 to focus the beam of RF signals in identified test directions or null out areas where no UEs are detected. The controller 116 may be configured to utilize the beam splitting settings 210B to adjust beam splitting ratios, which may alter the direction and shape of the transmitted beams, potentially leading to better coverage or isolation of specific UEs. The controller 116 may be configured to utilize the transmit beam power settings 210C to increase or decrease the power of individual beams based on the UE responses. Stronger power might be needed for distant UEs with weak responses, while weaker power might be sufficient for nearby UEs with strong responses. After adjusting the different settings, the controller 116 may retransmit one or more beams of RF signals using the modified settings. This re-detection process may ensure that UEs within the defined physical coverage zone 110 may be detected and their locations are accurately estimated and at the same time resource allocation are optimized.

The UE response analyzer 212 may be configured to analyze different responses received from different UEs, such as the first UE 106 and the second UE 108. The UE response may include information of UEs increasing or decreasing the Tx power based on the forced increase or decrease of the Tx power level of communicated beam(s) from the access repeater device 102C via the one or more service antenna arrays 206.

The enhanced Repeater-UE connectivity database 214 indicates a relationship between a beam pattern, a beam transmit power, and a location of a number of UEs distributed at a plurality of different locations within the defined physical coverage zone 110 of the access repeater device 102C.

The neural network model 216 may be configured to utilize the enhanced Repeater-UE connectivity database 214 to learn optimal configurations to balance trade-offs between beam patterns selected, a given transmit power level to select for a given location or range of UE within the defined physical coverage zone 110 and what beamforming strategy is best to cover different UEs distributed within defined physical coverage zone 110 and its impact on connectivity quality.

The set of amplifiers 218 may be configured to provide signal gain to overcome propagation losses and boost SNR to maintain link budgets over multiple hops of relaying, such as across the network of repeater devices all the way to the one or more UEs. In an implementation, the set of amplifiers 218 may be high-gain amplifiers designed to operate in the intermediate frequencies or mmWave frequency bands.

The set of phase shifters 220 may be configured to perform precise phase control to digitally steer beams in directed orientations based on control instructions received from the controller 116. In some implementations, the control instructions may be received from a central cloud server or one of the network nodes of the network of the repeater devices.

The frequency converter 222 may be configured to upconvert or down convert one radio frequency to another radio frequency of an RF signal. For example, the access repeater device 102C may utilize the frequency converter 222 to convert an intermediate frequency (IF), such as a mmWave frequency to a WLAN signal or another FR1 or FR 2 band of 5G new radio (NR). The frequency converter 222 may perform frequency up conversion by frequency mixing with a local oscillator signal. In some embodiments, the frequency converter 222 may include a phased locked loop (PLL) circuit, which acts as a local oscillator.

In accordance with an embodiment, the controller 116 may be further configured to generate the enhanced Repeater-UE connectivity database 214 over a period of time comprising a relationship between a beam pattern, a beam transmit power, and a location of a number of UEs distributed at a plurality of different locations within the defined physical coverage zone 110 of the access repeater device 102C. The controller 116 of the access repeater device 102C may generate the enhanced Repeater-UE connectivity database 214 over time by establishing and recording relationships between the beam pattern, the beam transmit power, and the locations of multiple UEs distributed across various positions within the defined physical coverage zone 110. This involves continuously monitoring and collecting data on the beam patterns employed, associated beam transmit-power levels, and the corresponding locations of UEs over an extended period. By analyzing this information, the access repeater device 102C may compile a comprehensive database that elucidates the nuanced connectivity dynamics between beam patterns, power levels, and UE locations. This enhanced Repeater-UE connectivity database 214 may serve as a valuable resource for optimizing future communication strategies, enabling the access repeater device 102C to adapt and enhance its performance based on historical patterns and insights. An exemplary enhanced Repeater-UE connectivity database is given in table 1, in an example.

TABLE 1

| UE ID | Time Stamp | Repeater Beam Pattern | Repeater Tx Power (dBm) | UE Location (X, Y) | UE Tx Power (dBm) | UE RSSI (dBm) | Performance |
| --- | --- | --- | --- | --- | --- | --- | --- |
| UE1 | YYYY-MM-DD-HR-Mi-Se | Pattern 1 | Normal (X dBm) | (10, 5) | Initial (−Y dBm) | −>100 dbm | Poor |
| UE1 | YYYY-MM-DD-HR-Mi-Se | Pattern 1 | Decreased (X − 5) dBm | (10, 5) | Increased (−Y + 10 dBm) | −85 | Fair |
| UE1 | YYYY-MM-DD-HR-Mi-Se | Pattern 2 | Normal (X dBm) | (10, 5) | Slightly Increased | −70 | Good |

TABLE 1-continued

| UE ID | Time Stamp | Repeater Beam Pattern | Repeater Tx Power (dBm) | UE Location (X, Y) | UE Tx Power (dBm) | UE RSSI (dBm) | Performance |
|---|---|---|---|---|---|---|---|
| UE1 | YYYY-MM-DD-HR-Mi-Se | Pattern 2 | Increased (X + 5) dBm | (10, 5) | (−Y + 5) dBm Decreased (−Y − 5 dBm) | −50 | Excellent |
| ... | ... | ... | ... | ... | ... | ... | ... |
| UE nth | ... | ... | ... | ... | ... | ... | ... |

Training Phase of the Neural Network Model 216:

In accordance with an embodiment, in the training phase, when the access repeater device 102C adjusts configurations like the beam patterns (for example, wide beam or narrow beam defined by beam angles or beam cone), transmit power levels and polarization, the enhanced Repeater-UE connectivity database 214 may capture metrics on the resulting impact to connectivity quality (tracked via received signal strength indicator (RSSI) from a given UE) and throughput for associated UEs mapped locations. By forming the enhanced Repeater-UE connectivity database 214 over a range of use cases, the neural network model 216 may recognize which beam and power parameters work best under different conditions to optimize service to a plurality of different distributions of UEs across the defined physical coverage zone 110. This improves self-configuring and adaptation capabilities when addressing new UE positions or densities or a new distribution scenario. In some implementations, additional dimensions may be added to include device types or models to account for antenna differences, transmission frequencies, bandwidth consumed, etc. in the training phase.

In the training phase, the controller 116 may be configured to generate training datasets using repeater-UE data interactions collected and recorded over various conditions and periods of time (e.g., data captured when the repeater periodically reduces it's transmit-power and records resulting transmit power increases from UEs from the enhanced Repeater-UE connectivity database 214). For example, a baseline data collection may be performed where, for example, the access repeater device 102C may start with an initial default state: 45° beam pattern, 15 dBm transmit power. Then RSSI and throughput metrics for associated UEs over time may be measured. This allows to gather baseline visibility into current connectivity and service levels. Thereafter, intentional different parameter adjustment may be performed, for example, reducing transmit power from 15 dBm down to 12 dBm. This simulates the access repeater device 102C appearing farther away from UEs. Thereafter, UE response characteristics may be recorded. As UEs perceive increased distance to repeater, their transmit power reacts. For example, UE1 may increase transmit power from 10 dBm to 14 dBm trying to reestablish signal strength. Other nearby UEs may demonstrate varied response profiles as well. Thereafter, impact may be analyzed on RSSI levels and UE throughput performance may be examined. This may reveal the relationships between parameter changes and UE behaviors. Thereafter, further optimization may be performed where with UE response profiles may be learned and incremental beam pattern changes may be tested. For example, beam pattern may be narrowed to 30 degrees and the transmit power level may be boosted back to 15 dBm at the access repeater device 102C.

Thereafter, data may be collected on resulting UE RSSI and throughput. Thereafter, control policy of the neural network model 216 may be updated where configurations tailored to different distributions of UEs may be measured. This strategic regulation based on eliciting and learning different UEs response located at different locations may improve overall network efficiency over time and enable more personalized optimization routines.

In accordance with an embodiment, the neural network model 216 may be configured to predict optimal repeater transmit power reduction amounts and periods to achieve desired increases in UE transmit power based on multiple input factors, such as locations, angle, and distance from the access repeater device 102C. The neural network model 216 may utilize regression models or sequence models like Recurrent Neural Network (RNN) and Long Short-Term Memory (LSTM), reinforcement learning or other deep learning techniques for training purposes. In an implementation, rather than training once on static data, new RF response data generated daily or periodically may be integrated into updated neural network model 216 learning cycles. Expanding datasets allow more robust model optimization on previously unseen scenarios. Prior learned behaviors and response patterns may be retained while accommodating new factors. This reduces recourse to inefficient full retraining from scratch. The neural network model 216 may generalize insights across environments, progressively enhancing adaptation skills when faced with novel conditions or unfamiliar UE behaviors through sustained transfer learning. This enables managing unseen UEs or locations via contextual response rules generated in the neural network model 216 in the training phase.

In an example, to train the neural network model 216, initially model parameters of the neural network model 216 may be initialized. The neural network model 216 may begin with random weights for inputs like repeater beam patterns, UE locations, and the like and bias terms. Outputs may be initialized randomly as well. Thereafter, forward propagation may be executed where a first data row of the enhanced Repeater-UE connectivity database 214 may be passed through the input layer of the neural network model 216. Thereafter, a loss function may be applied where an error of false outputs versus an actual UE RSSI and throughput values for the whole dataset may be evaluated. Thereafter, backpropagation may be applied in which weights and biases for beam pattern, TX power, location inputs against actual UE response targets may be updated, to reduce collective error across batches. Previous steps of forward propagation, the loss function application, and the backpropagation may be iterated as weights and activations adjust across layers, thus improving predictions for each row over time. The neural network model 216 may be validated for its accuracy using test dataset splits not used in previous training loop. The accuracy of the neural network model 216 once trained may be more than 97%, in the range of 97-99.7%.

In the operational phase, the neural network model 216 (after training) may be deployed in the access repeater device 102C or a new access repeater device. The controller 116 may execute the neural network model 216 after training to select a best combination of the antenna pattern settings 210A, the beam splitting settings 210B, and the transmit beam power settings 210C for the re-detection of the distribution of the set of UEs within the defined physical coverage zone 110, based on the UE response. The controller 116 may execute the neural network model 216 to optimize the beamforming strategy. For example, if the UEs are relatively stationary and close together, the controller 116 of the access repeater device 102C may be further configured to either optimize its beam by changing its beam pattern or split into two beams of RF signals to improve coverage and signal strength for all UEs. The neural network model 21 may be executed to set the gain of both beams equally to provide consistent coverage throughout the area (i.e., the defined physical coverage zone 110). However, when dealing with distant UEs, the access repeater device 102C may be configured to split the beam into two separate beams with different polarizations using output values predicted from the neural network model 216. Thus, through this interplay of adjusting the antenna pattern, splitting the beam, and manipulating power, the access repeater device 102C may effectively not only detect the users' locations but significantly improve the network performance using the neural network model 216.

Figure 3:
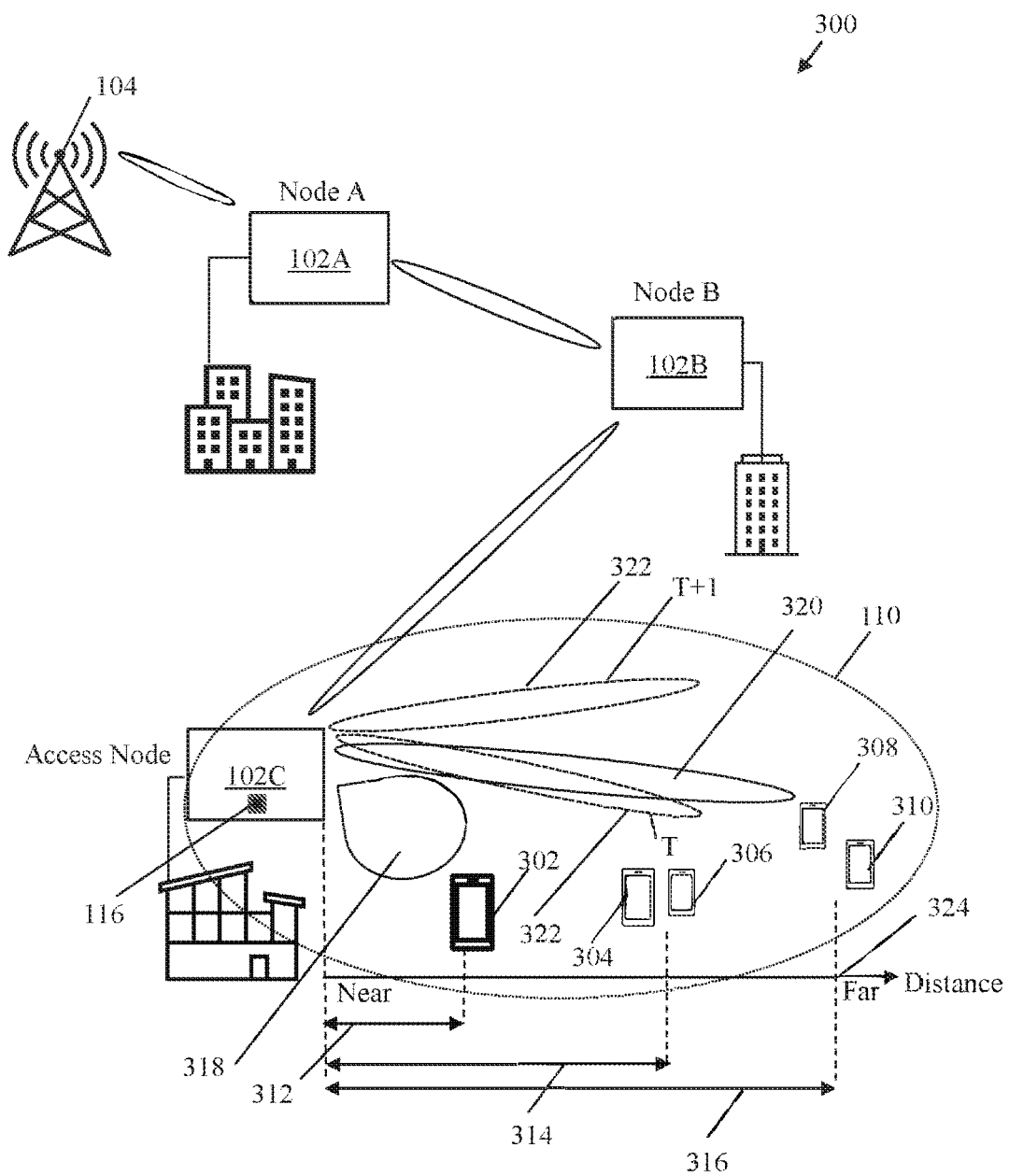
FIG. 3 is a diagram illustrating an exemplary scenario of implementation of an access repeater device in a wireless communication system, in accordance with an exemplary embodiment of the disclosure.

FIG. 3 is a diagram illustrating an exemplary scenario of implementation of an access repeater device in a wireless communication system, in accordance with an exemplary embodiment of the disclosure. FIG. 3 is explained in conjunction with elements from FIGS. 1 and 2. With reference to FIG. 3, there is shown an exemplary scenario 300 of implementation of the wireless communication system 100 (of FIG. 1), in which the access repeater device 102C may be configured to currently serve a set of UEs 302 to 310 distributed at different ranges (e.g., a first range 312, a second range 314, and a third range 316) from the access repeater device 102C in the defined physical coverage zone 110. In the exemplary scenario 300, there is further shown three different beams of RF signals in different beam patterns, such as a first beam of RF signals 318, a second beam of RF signals 320, and a third beam of RF signals 322.

In operation, the controller 116 of the access repeater device 102C may be configured to detect a distribution of a set of user equipment (UEs) within the defined physical coverage zone 110 of the access repeater device 102C at a first instance. An initial beam of RF signals, such as the third beam of RF signals 322 at time T may be used initially to scan the defined physical coverage zone 110 in a horizontal plane with reference to a ground plane 324 (e.g., earth's surface) to locate a distribution different UEs, whose locations may be unknown at the time T within the defined physical coverage zone 110. The purpose of the scan may be to detect whether any UEs are present and if present their locations within the defined physical coverage zone 110. At the first instance (e.g., at the time T), the UE 302 may be detected at the first range 312 from the access repeater device 102C within the defined physical coverage zone 110. The first range 312 may be comparatively near to the access repeater device 102C may be easily visible to the access repeater device 102C, so the UE 302 may be detected by the access repeater device 102C by the initial scan using the initial beam of RF signals (i.e., the third beam of RF signals 322) transmitted at the first Tx power level (e.g., 15 dBm) from the access repeater device 102C. There may be a first group of UEs (e.g., the UEs 304 and 306) in the mid-range (i.e., the second range 314). For the first group of UEs in the mid-range (e.g., the UEs 304 and 306), the access repeater device 102C may still detect their RF signals, which is also acceptable. However, there may be a challenge with a second group of UEs (e.g., the UEs 308 and 310), which may be far from the access repeater device 102C and may not be detected because they remain hidden to the access repeater device 102C (because the second group of UEs may not be transmitting RF signals at a power level not sufficient for any detection at the time T).

The controller 116 of the access repeater device 102C may be configured to control decrease of the first Tx power level of the initial beam of RF signals (e.g., the third beam of RF signals 322) from the access repeater device 102C to a second Tx power level. In other words, the access repeater device 102C employs an intelligent strategy which involves deliberate or forced lowering the Tx power level forcing the hidden UEs (such as the UEs 308 and 310 not transmitting previously RF signals at high power) to transmit at a higher power level. In other words, the decrease of the first Tx power level of the third beam of RF signals 322 may induce a UE response at the UEs 308 and 310 present in the third range 316 to increase a Tx radio power of RF signals emitted by the second group of UEs (i.e., UEs 308 and 310) previously hidden to the access repeater device 102C at the first instance (i.e., time T). Thus, when the access repeater device 102C controls the forced decrease of the first Tx power level of the third beam of RF signals 322 from the access repeater device 102C to the second Tx power level (i.e., intentionally transmits at a low power level), the second group of UEs (i.e., UEs 308 and 310) may adapt and respond by increasing its' transmit power.

Based on the UE response, the controller 116 may be further configured to execute a beam splitting operation in which the first beam of RF signals 318 in a first polarization (e.g., V polarization) and a first beam pattern (e.g., wide beam of 45 degrees angle) with a first Tx power (e.g., 10 dBm) may be locked on the UEs 302, 304 and 306 (covering up to the second range 314). Further, concurrently, the second beam of RF signals 320 in a second polarization (may be polarization V or H) with an updated Tx power level (e.g., 13 dBm) may be directed at the second group of UEs (e.g., the UEs 308 and 310) at the third range 316 from the access repeater device 102C. This updated Tx power level may also save power consumption at the second group of UEs (e.g., the UEs 308 and 310) at the third range 316. In this case along with polarization diversity, different Tx power may be used for UEs at different ranges for reduced power consumption at the UEs (due to less radiated energy). This approach potentially not only improves signal quality for both all UEs but also reduces interference, improves UE power consumption (i.e., >15-40% UE power consumption reduction), and leverages polarization diversity to mitigate signal fading.

The controller 116 may be further configured to re-detect the distribution of the set of UEs at the second instance (i.e., at time T+1) within the defined physical coverage zone 110, based on the different UE responses. At the second instance the detected set of UEs may comprise the UEs 302 to 310 (i.e., all UEs in the defined physical coverage zone 110). Thus, the distribution of the set of UEs in the defined physical coverage zone 110 may be re-evaluated based on corresponding UE responses, allowing it to adjust its operations, like adjusting beam pattern, transmit power level, or polarization setting to maintain efficient communication with users at different locations.

In accordance with an embodiment, the controller 116 may be further configured to free-up a beam of RF signals, such as the third beam of RF signals 322 at time T+1, which may then be used to further and periodically scan the defined physical coverage zone 110 in the horizontal plane with reference to the ground plane 324 to locate any new UE within the defined physical coverage zone 110 while one or more service beams of RF signals (e.g., the first beam of RF signals 318 and the second beam of RF signals 320 in the exemplary scenario 300) are concurrently locked onto the currently detected set of UEs, such as the UEs 302 to 310. The scan process may be periodically performed to re-detect and/or re-locate any updated distribution of different UEs within the defined physical coverage zone 110.

Figure 4A:
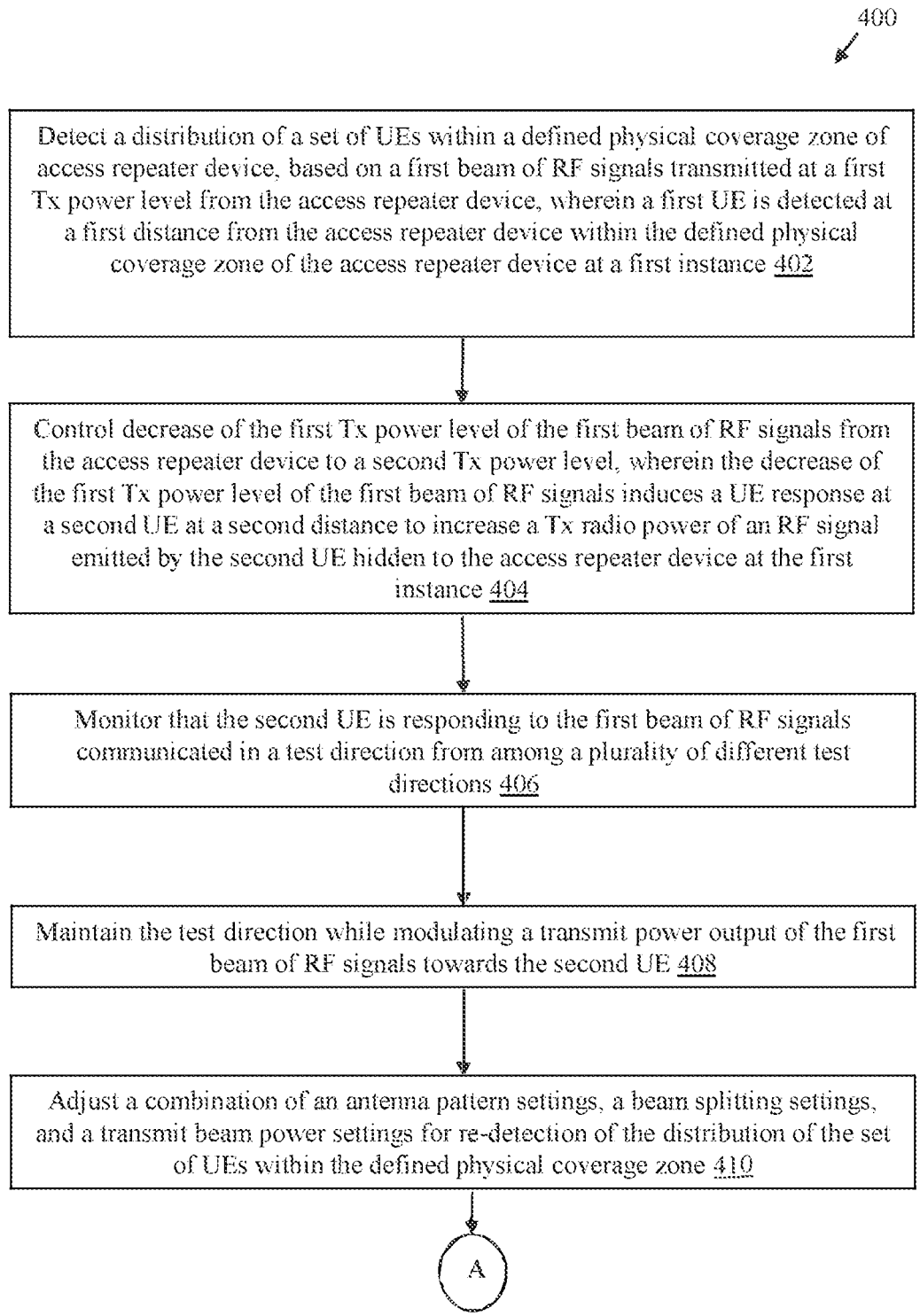
FIG. 4A, FIG. 4B, and FIG. 4C, collectively, is a flowchart of a method of detecting distribution of user equipment (UEs) based on induced UE response, in accordance with an embodiment of the disclosure.
Figure 4B:
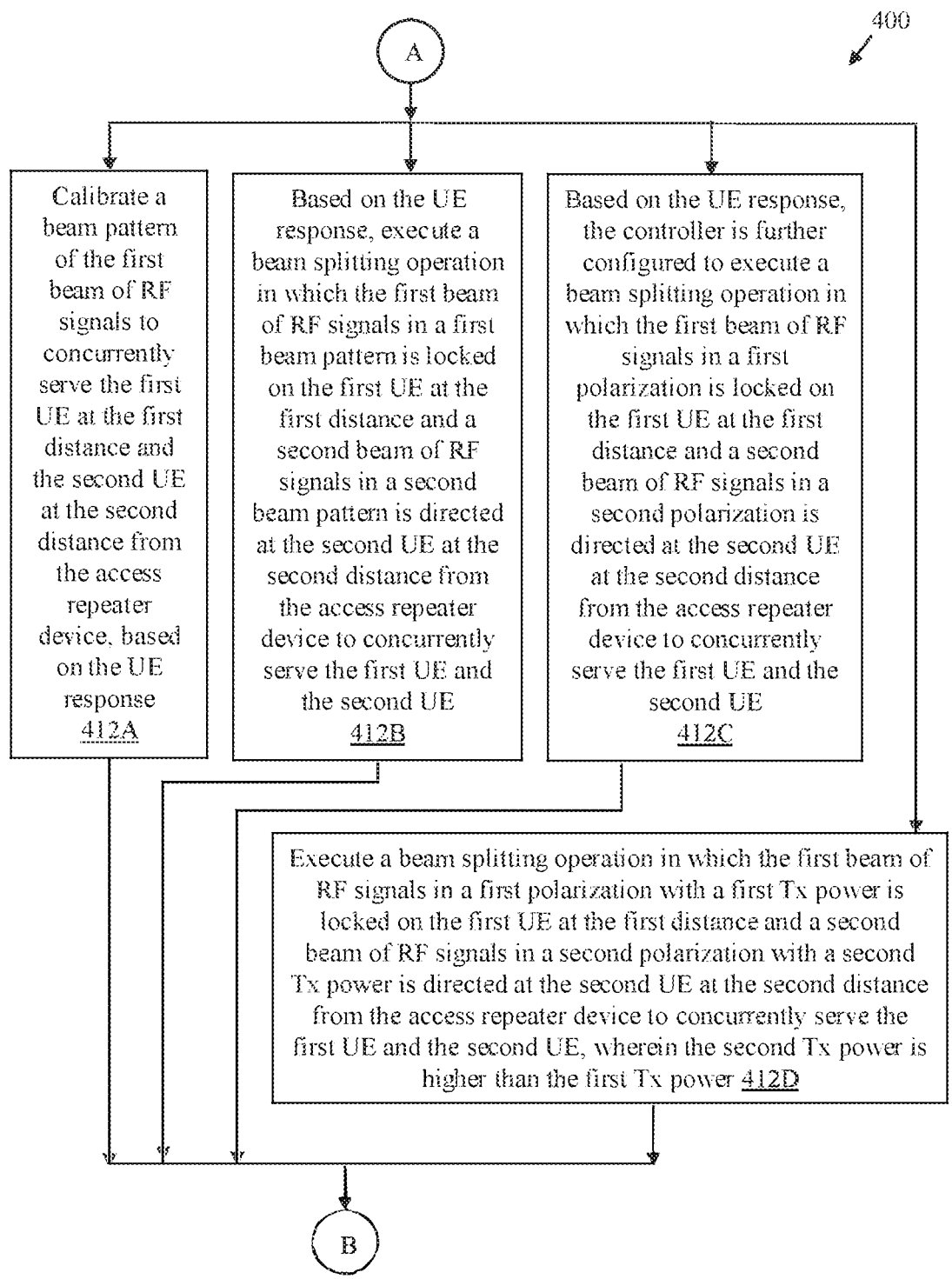
Figure 4C:
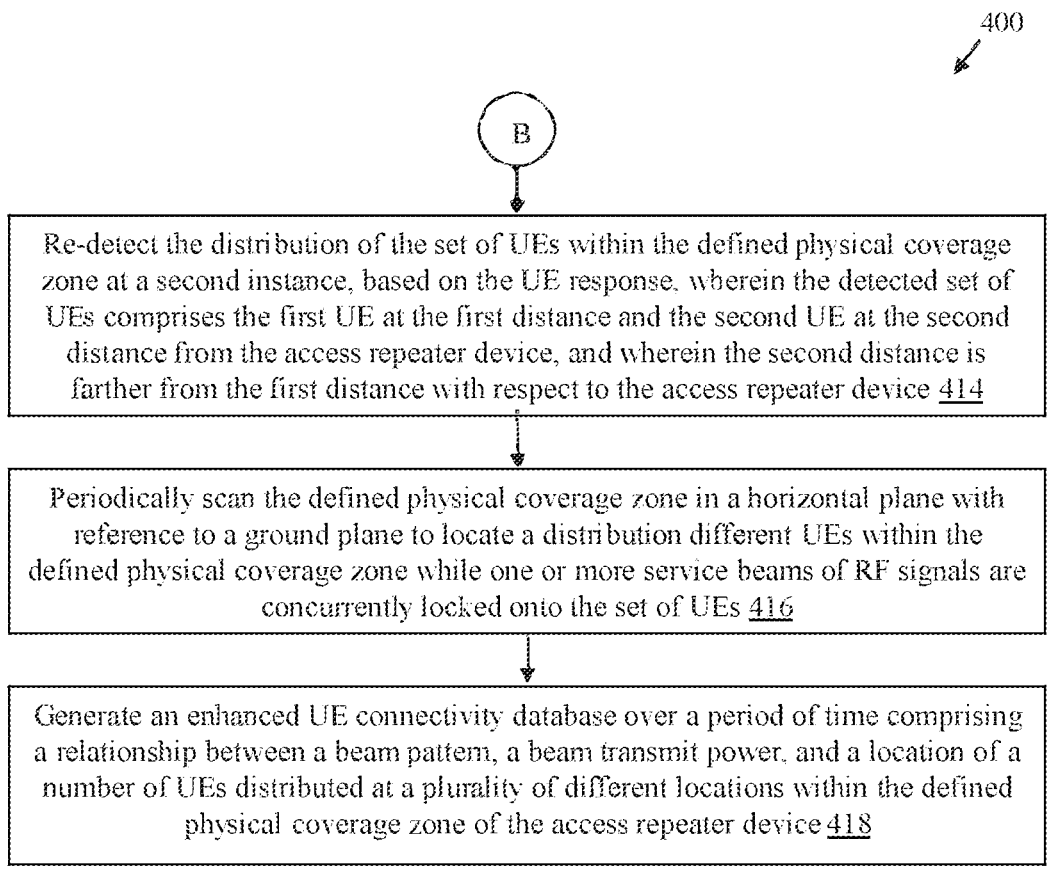

FIG. 4A, FIG. 4B, and FIG. 4C collectively, is a flowchart of a method of detecting distribution of user equipment (UEs) based on induced UE response, in accordance with an embodiment of the disclosure. FIGS. 4A, 4B, and 4C are explained in conjunction with elements from FIGS. 1, 2, and 3. With reference to FIGS. 4A, 4B, and 4C, there is shown a flowchart of a method 400 comprising exemplary operations 402 through 418. The method 400 may be implemented in the access repeater device 102C.

At 402, a distribution of a set of user equipment (UEs) may be detected within a defined physical coverage zone 110 of the access repeater device 102C, based on a first beam of radio frequency (RF) signals transmitted at a first transmit (Tx) power level from the access repeater device 102C. The first UE 106 may be detected at the first distance 112 from the access repeater device 102C within the defined physical coverage zone 110 of the access repeater device 102C at a first instance.

At 404, decrease of the first Tx power level of the first beam of RF signals may be controlled from the access repeater device 102C to a second Tx power level. The decrease of the first Tx power level of the first beam of RF signals may induce a UE response at a second UE 108 at a second distance to increase a Tx radio power of an RF signal emitted by the second UE 108 hidden to the access repeater device 102C at the first instance. In accordance with an embodiment, the decrease of the first Tx power level of the first beam of RF signals may be performed periodically or in a targeted operation to present the access repeater device 102C at a greater distance that its actual location, compelling the second UE 108 to come out of hiding by increasing the Tx radio power at the second UE 108 in a closed-loop feedback.

At 406, it may be monitored that the second UE 108 is responding to the first beam of RF signals communicated in a test direction from among a plurality of different test directions.

At 408, the test direction may be maintained while modulating a transmit power output of the first beam of RF signals towards the second UE 108.

At 410, a combination of the antenna pattern settings 210A, the beam splitting settings 210B, and the transmit beam power settings 210C may be adjusted for the re-detection of the distribution of the set of UEs within the defined physical coverage zone 110, based on the UE response. The control from 410 may pass to one of 412A, 412B, 412C, or 412D.

At 412A, a beam pattern of the first beam of RF signals may be calibrated to concurrently serve the first UE 106 at the first distance 112 and the second UE 108 at the second distance 114 from the access repeater device 102C, based on the UE response.

At 412B, based on the UE response, a beam splitting operation may be executed in which the first beam of RF signals in a first beam pattern is locked on the first UE 106 at the first distance 112 and a second beam of RF signals in a second beam pattern is directed at the second UE 108 at the second distance 114 from the access repeater device 102C to concurrently serve the first UE 106 and the second UE 108.

At 412C, based on the UE response, a beam splitting operation may be executed in which the first beam of RF signals in a first polarization is locked on the first UE 106 at the first distance 112 and a second beam of RF signals in a second polarization is directed at the second UE 108 at the second distance 114 from the access repeater device 102C to concurrently serve the first UE 106 and the second UE 108.

At 412D, based on the UE response, a beam splitting operation may be executed in which the first beam of RF signals in a first polarization with a first Tx power is locked on the first UE 106 at the first distance 112 and a second beam of RF signals in a second polarization with a second Tx power is directed at the second UE 108 at the second distance 114 from the access repeater device 102C to concurrently serve the first UE 106 and the second UE 108. The second Tx power may be higher than the first Tx power.

At 414, the distribution of the set of UEs may be re-detected within the defined physical coverage zone 110 at a second instance, based on the UE response. The detected set of UEs may comprise the first UE 106 at the first distance 112 and the second UE 108 at the second distance from the access repeater device 102C. The second distance 114 may be farther from the first distance 112 with respect to the access repeater device 102C.

At 416, the defined physical coverage zone 110 may be periodically scanned in a horizontal plane with reference to a ground plane to locate a distribution different UEs within the defined physical coverage zone 110 while one or more service beams of RF signals are concurrently locked onto the set of UEs.

At 418, the enhanced Repeater-UE connectivity database 214 may be generated over a period of time comprising a relationship between a beam pattern, a beam transmit power, and a location of a number of UEs distributed at a plurality of different locations within the defined physical coverage zone 110 of the access repeater device 102C.

Various embodiments of the disclosure may provide the access repeater device 102C (FIG. 1). The access repeater device 102C comprises the controller 116 configured to detect a distribution of a set of user equipment (UEs) within the defined physical coverage zone 110 of the access repeater device 102C, based on a first beam of radio frequency (RF) signals transmitted at a first transmit (Tx) power level from the access repeater device 102C, wherein a first UE 106 is detected at a first distance 112 from the access repeater device 102C within the defined physical coverage zone 110 of the access repeater device 102C at a first instance. The controller 116 is further configured to control decrease of the first Tx power level of the first beam of RF signals from the access repeater device 102C to a second Tx power level, wherein the decrease of the first Tx power level of the first beam of RF signals induces a UE response at a second UE 108 at a second distance to increase a Tx radio power of an RF signal emitted by the second UE 108 hidden to the access repeater device 102C at the first instance. The controller 116 is further configured to re-detect the distribution of the set of UEs within the defined physical coverage zone 110 at a second instance, based on the UE response, wherein the detected set of UEs comprises the first UE 106 at the first distance 112 and the second UE 108 at the second distance from the access repeater device 102C, and wherein the second distance 114 is farther from the first distance 112 with respect to the access repeater device 102C.

Various embodiments of the disclosure may provide a computer program product for detecting distribution of user equipment (UEs), the computer program product comprising a computer-readable storage medium (e.g., a non-transitory computer-readable storage medium) having program instructions embodied therewith, the program instructions are executable by a system to cause the system to execute operations, the operations comprising detecting a distribution of a set of user equipment (UEs) within a defined physical coverage zone 110 of the access repeater device 102C, based on a first beam of radio frequency (RF) signals transmitted at a first transmit (Tx) power level from the access repeater device 102C, wherein a first UE 106 is detected at a first distance 112 from the access repeater device 102C within the defined physical coverage zone 110 of the access repeater device 102C at a first instance. The operations further comprise controlling a decrease of the first Tx power level of the first beam of RF signals from the access repeater device 102C to a second Tx power level, wherein the decrease of the first Tx power level of the first beam of RF signals induces a UE response at a second UE 108 at a second distance 114 to increase a Tx radio power of an RF signal emitted by the second UE 108 hidden to the access repeater device 102C at the first instance. The operations further comprise re-detecting the distribution of the set of UEs within the defined physical coverage zone 110 at a second instance, based on the UE response, wherein the set of UEs that are re-detected comprises the first UE 106 at the first distance 112 and the second UE 108 at the second distance 114 from the access repeater device 102C, and wherein the second distance 114 is farther from the first distance 112 with respect to the access repeater device 102C.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. An access repeater device, comprising:
   a controller configured to:
   control transmission of a first beam of radio frequency (RF) signals at a first transmit (Tx) power level, wherein a first user equipment (UE) of a set of UEs is detected at a first distance from the access repeater device at a first instance;

control a decrease of the first Tx power level of the first beam of RF signals to a second Tx power level, wherein the decrease of the first Tx power level of the first beam of RF signals induces a UE response at a second UE, of the set of UEs, at a second distance from the access repeater device to increase a Tx radio power of an RF signal emitted by the second UE;

identify that the second UE responds to the first beam of RF signals communicated in a test direction from a plurality of different test directions; and modulate a transmit power output of the first beam of RF signals towards the second UE in the test direction.

2. The access repeater device according to claim 1, wherein the controller is further configured to detect a distribution of the set of UEs, within a defined physical coverage zone at a second instance, based on the UE response, the detection of the distribution of the set of UEs comprises detection of the second UE at the second instance, the set of UEs comprises the first UE at the first distance and the second UE at the second distance from the access repeater device, and the second distance is farther from the first distance with respect to the access repeater device.

3. The access repeater device according to claim 2, wherein based on the UE response, the controller is further configured to adjust a combination of an antenna pattern settings, a beam splitting settings, and a transmit beam power settings for the detection of the distribution of the set of UEs within the defined physical coverage zone.

4. The access repeater device according to claim 1, wherein the controller is further configured to control the decrease of the first Tx power level of the first beam of RF signals, one of periodically or in a targeted operation, to present the access repeater device at a greater distance than an actual location of the access repeater device, and the decrease of the first Tx power level one of periodically or in the targeted operation causes the second UE to exit hide by an increase of the Tx radio power at the second UE in a closed-loop feedback.

5. The access repeater device according to claim 1, wherein the controller is further configured to calibrate, based on the UE response, a beam pattern of the first beam of RF signals to concurrently serve the first UE at the first distance and the second UE at the second distance from the access repeater device.

6. The access repeater device according to claim 1, wherein the controller is further configured to execute a beam splitting operation to concurrently serve the first UE and the second UE based on the first beam of RF signals and a second beam of RF signals.

7. The access repeater device according to claim 6, wherein the execution of the beam splitting operation is further based on the UE response, and the beam splitting operation includes:

the first beam of RF signals in a first beam pattern locked on the first UE at the first distance, and the second beam of RF signals in a second beam pattern directed at the second UE at the second distance from the access repeater device.

8. The access repeater device according to claim 6, wherein the execution of the beam splitting operation is further based on the UE response, and the beam splitting operation includes:

the first beam of RF signals in a first polarization locked on the first UE at the first distance, and the second beam of RF signals in a second polarization directed at the second UE at the second distance from the access repeater device.

9. The access repeater device according to claim 6, wherein the execution of the beam splitting operation is further based on the UE response, and the beam splitting operation includes:

the first beam of RF signals in a first polarization with a first Tx power locked on the first UE at the first distance, and the second beam of RF signals in a second polarization with a second Tx power directed at the second UE at the second distance from the access repeater device, and the second Tx power higher than the first Tx power.

10. The access repeater device according to claim 1, wherein the controller is further configured to periodically scan a defined physical coverage zone in a horizontal plane with reference to a ground plane to locate a distribution of different UEs within the defined physical coverage zone while one or more service beams of RF signals are concurrently locked onto the set of UEs.

11. The access repeater device according to claim 10, wherein the controller is further configured to detect the distribution of the set of UEs, within the defined physical coverage zone of the access repeater device, based on the transmission of the first beam of RF signals.

12. The access repeater device according to claim 11, wherein the controller is further configured to generate an enhanced UE connectivity database over a period of time comprising a relationship between a beam pattern, a beam transmit power, and a location of a number of UEs distributed at a plurality of different locations within the defined physical coverage zone of the access repeater device, and the number of UEs includes the set of UEs.

13. A method, comprising:

in an access repeater device:

controlling transmission of a first beam of radio frequency (RF) signals at a first transmit (Tx) power level, wherein a first user equipment (UE) of a set of UEs is detected at a first distance from the access repeater device at a first instance;

controlling a decrease of the first Tx power level of the first beam of RF signals to a second Tx power level, wherein the decrease of the first Tx power level of the first beam of RF signals induces a UE response at a second UE, of the set of UEs, at a second distance from the access repeater device to increase a Tx radio power of an RF signal emitted by the second UE;

identifying that the second UE responds to the first beam of RF signals communicated in a test direction from a plurality of different test directions; and modulating a transmit power output of the first beam of RF signals towards the second UE in the test direction.

14. The method according to claim 13, further comprising detecting a distribution of the set of UEs, within a defined physical coverage zone at a second instance, based on the UE response, wherein
- the detecting of the distribution of the set of UEs comprises detecting of the second UE at the second instance,
- the set of UEs comprises the first UE at the first distance and the second UE at the second distance from the access repeater device, and
- the second distance is farther from the first distance with respect to the access repeater device.

15. The method according to claim 13, further comprising controlling the decrease of the first Tx power level of the first beam of RF signals, one of periodically or in a targeted operation, to present the access repeater device at a greater distance than an actual location of the access repeater device,
- wherein the decrease of the first Tx power level one of periodically or in the targeted operation causes the second UE to come out of hiding by increasing the Tx radio power at the second UE in a closed-loop feedback.

16. The method according to claim 13, further comprising calibrating, based on the UE response, a beam pattern of the first beam of RF signals to concurrently serve the first UE at the first distance and the second UE at the second distance from the access repeater device.

17. The method according to claim 13, further comprising executing a beam splitting operation to concurrently serve the first UE and the second UE based on the first beam of RF signals and a second beam of RF signals, wherein
- the execution of the beam splitting operation is further based on the UE response, and
- the beam splitting operation includes:
  - the first beam of RF signals in a first beam pattern locked on the first UE at the first distance, and
  - the second beam of RF signals in a second beam pattern directed at the second UE at the second distance from the access repeater device.

18. The method according to claim 13, further comprising executing a beam splitting operation to concurrently serve the first UE and the second UE based on the first beam of RF signals and a second beam of RF signals, wherein
- the execution of the beam splitting operation is further based on the UE response, and
- the beam splitting operation includes:
  - the first beam of RF signals in a first polarization locked on the first UE at the first distance, and
  - the second beam of RF signals in a second polarization directed at the second UE at the second distance from the access repeater device.

19. The method according to claim 13, further comprising executing a beam splitting operation to concurrently serve the first UE and the second UE based on the first beam of RF signals and a second beam of RF signals, wherein
- the execution of the beam splitting operation is further based on the UE response, and
- the beam splitting operation includes:
  - the first beam of RF signals in a first polarization with a first Tx power is locked on the first UE at the first distance, and
  - the second beam of RF signals in a second polarization with a second Tx power is directed at the second UE at the second distance from the access repeater device, wherein the second Tx power is higher than the first Tx power.

20. A non-transitory computer-readable medium having stored thereon, computer-executable instructions, which when executed a processor of an access repeater device, cause the processor to execute operations, the operations comprising:
- controlling transmission of a first beam of radio frequency (RF) signals at a first transmit (Tx) power level, wherein a first user equipment (UE) of a set of UEs is detected at a first distance from the access repeater device at a first instance;
- controlling a decrease of the first Tx power level of the first beam of RF signals to a second Tx power level, wherein
  - the decrease of the first Tx power level of the first beam of RF signals induces a UE response at a second UE, of the set of UEs, at a second distance from the access repeater device to increase a Tx radio power of an RF signal emitted by the second UE;
- identifying that the second UE responds to the first beam of RF signals communicated in a test direction from a plurality of different test directions; and
- modulating a transmit power output of the first beam of RF signals towards the second UE in the test direction.

* * * * *